Figure 1:
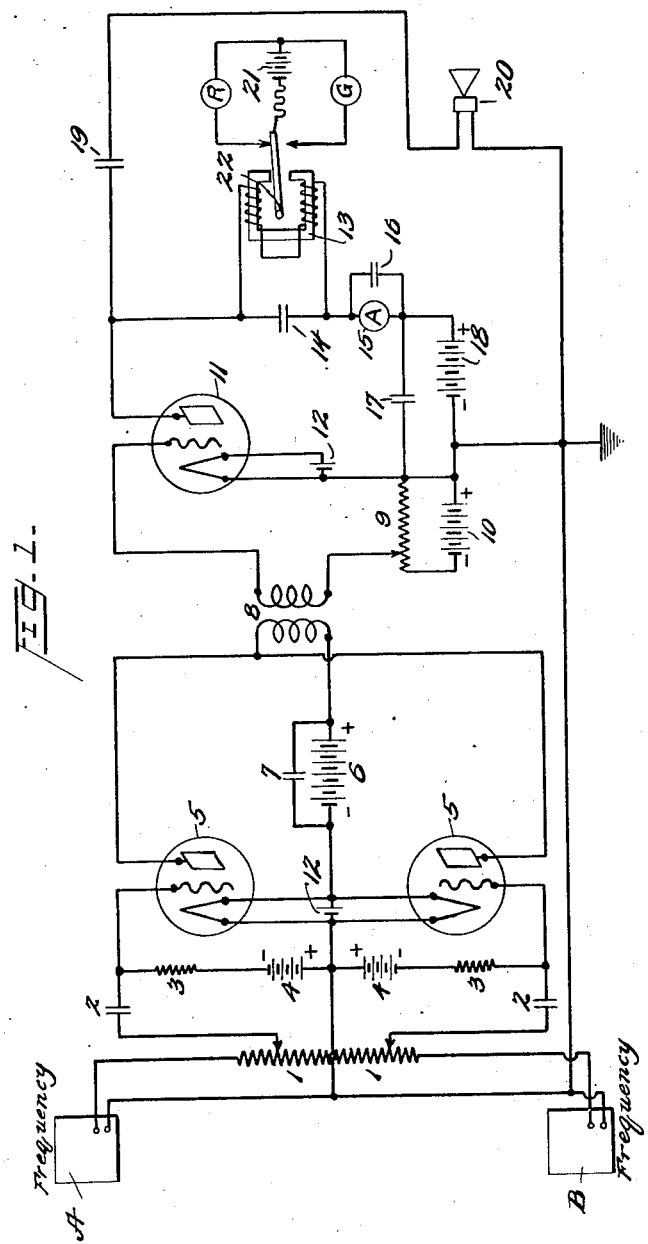

July 4, 1933.  A. CROSSLEY  1,916,782
FREQUENCY AND PHASE INDICATING SYSTEM
Filed June 11, 1928  2 Sheets-Sheet 1

Inventor
Alfred Crossley
By
Attorney

July 4, 1933.  A. CROSSLEY  1,916,782
FREQUENCY AND PHASE INDICATING SYSTEM
Filed June 11, 1928  2 Sheets-Sheet 2
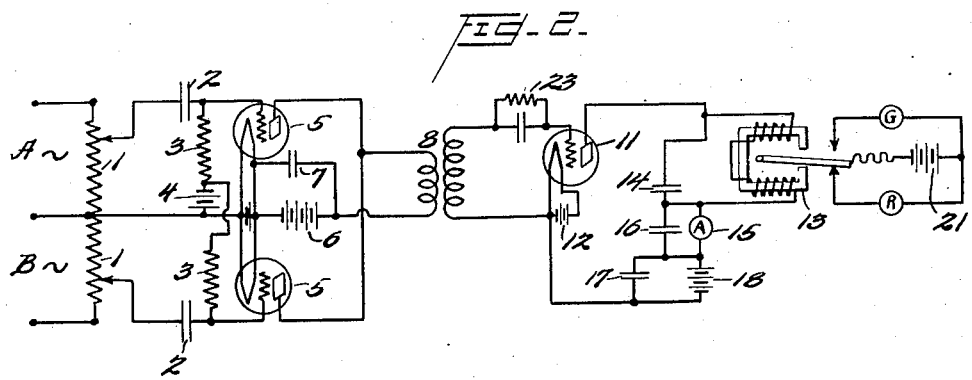
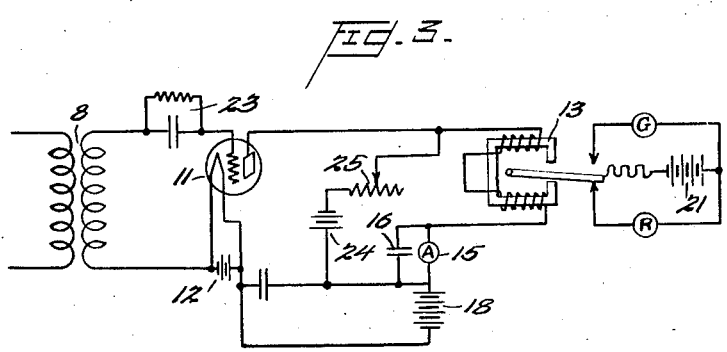
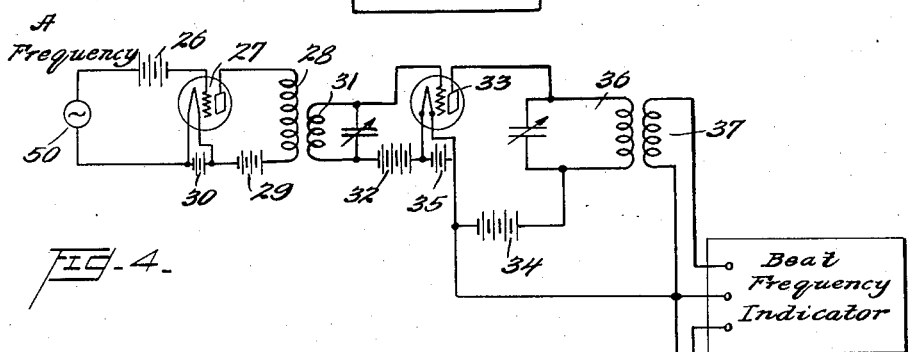
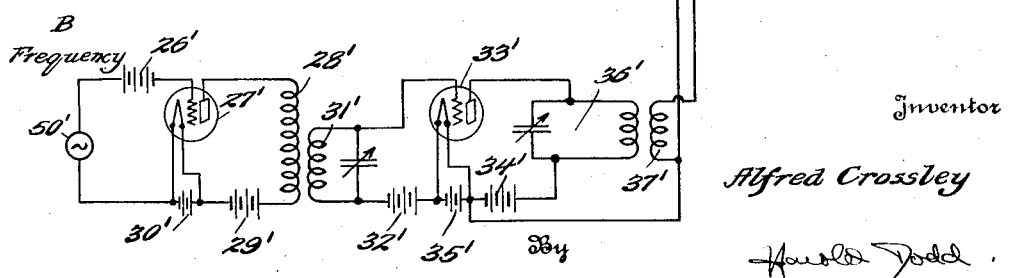
Inventor
Alfred Crossley
By Harold Todd
Attorney Patented July 4, 1933

1,916,782

UNITED STATES PATENT OFFICE

ALFRED CROSSLEY, OF WASHINGTON, DISTRICT OF COLUMBIA

FREQUENCY AND PHASE INDICATING SYSTEM

Application filed June 11, 1928. Serial No. 284,572.

My invention relates broadly to indicating apparatus and more particularly to a beat frequency and phase indicator.

One of the objects of my invention is to provide an apparatus for accurately indicating the frequency of an electrical circuit.

Another object of my invention is to provide a compact form of portable apparatus by which the frequency of current in an electrical circuit may be determined with a high degree of accuracy by utilizing the effect of beats upon an indicating apparatus.

A further object of my invention is to provide a frequency indicator wherein the unknown frequency may be compared with a source of known frequency for deriving a beat frequency, which beat frequency may be measured for giving an accurate indication of the value of unknown frequency.

A still further object of my invention is to provide a system for indicating the phase relationship between a plurality of frequencies when they are in the zero beat range.

Other and further objects of my invention reside in the circuit arrangements for the apparatus constituting the beat frequency indicator of my invention as described more fully in the specification hereinafter following and set forth in the accompanying drawings, in which:

Figure 1 is a diagrammatic illustration of the beat frequency indicator of my invention; Fig. 2 is a modified wiring diagram of the beat frequency indicator of my invention; Fig. 3 shows a further modification in the wiring of the indicator circuit in the beat frequency indicator; and Fig. 4 shows a method of increasing the accuracy of the readings of the beat frequency indicator by a system of frequency multiplication.

My invention is directed to the measurement of the absolute standards of frequency wherein it has become necessary to provide apparatus which will indicate the frequency difference in cycles between standards where the difference lies in the sub-audible frequency range, namely, from approximately 40 to less than one cycle. I have referred to the apparatus of my invention as the "beat frequency indicator".

This indicator may be described as a means whereby the excitation from one frequency source is made equal to that of another source by resort to the use of two potentiometers each of which function in supplying an equivalent voltage from the respective sources to the grids of two amplifying tubes. These tubes amplify the respective voltages and combine them in the primary of a radio or audio frequency transformer which through its secondary impresses these voltages on the grid of a blocked grid or detector tube. If the two voltages arrive at the grid of the detector tube with equal intensity, a beat note phenomenon is apparent in the plate circuit of the tube.

The phenomena can be indicated visually or aurally. The aural indicator may be a loud speaker or, if the power is great enough, a commercial type frequency meter may be employed as a visual indicator. When the frequency is below the range of a loud speaker or meter, resort may be made to the use of a relay which is actuated by the plate current variations. This relay in turn may actuate some form of chronograph or, if the frequency is below the range of persistent vision say 15 cycles, the relay can be made to operate a red and green lamp system which can flicker on and off in accordance with the beats. If, however, there is no difference in frequency between the two sources but a difference in time of starting of the two sources, i. e., a fixed phase difference, the relay will be in one position or another, for instance, if the frequencies are exactly in step there will be an addition of plate current, while if they are out of step, the plate current will be reduced according to how far they are out of step. The relay, preferably of the polarized type, can be adjusted to click off at maximum plate current condition and light a green light, while when in the out of step condition, i. e., smaller plate current, the relay returns to the neutral position and lights a red light. The above conditions refer to the use of the blocked grid tube as a detector. If a grid leak and condenser are employed, the reverse condition of plate current variation is noted.

Experiments conducted with two frequency sources of approximately 500 kilocycles, one of which was a self-oscillating circuit and the other a crystal oscillator, show that it is possible to adjust the frequency of the self-oscillator to be equal to the crystal oscillator as indicated by the green light and under conditions of a semi-tight coupling, the two frequencies will pull each other into step and hold this condition for as long as twenty minutes without manual adjustments.

Referring to the drawings in detail, two sources of frequency "A" and "B" are shown connected to the beat frequency indicator of my invention. Both sources feed into the potentiometers 1 and pass through the condensers 2 to the grids of each of the radio frequency amplifier tubes 5. A high resistance 3 and a negative "C" battery 4 maintain the grids at the desired biasing potential. The plates of the two tubes 5 are tied together and their combined outputs feed into the primary of transformer 8 and by the agency of the secondary the two frequency voltages are impressed on the grid of the detector tube 11. I. Figures 1 and 2 of the drawings a means consisting of the potentiometer 9 and battery 10 is employed to adjust the grid biasing potential so that a minimum plate current is obtained, as indicated by the meter 15, when no excitation is supplied to the grid from transformer 8. When the excitation voltage is applied to the grid of tube 11, the plate current rises in proportion to the strength of the exciting voltage. Two visual means for determining the frequency difference are shown in Fig. 1. One type is the meter 15 with the radio frequency by-pass condenser 16 and the other is the relay 13. Associated with the relay is a radio frequency by-pass condenser 14 and a red and green light combination designated "R" and "G" which function under action of relay contacts 22 and the battery 21. The green light goes on when the relay is actuated by a maximum current impulse while the red light operates at plate current of lower value. Battery 18 supplies necessary plate voltage for tube 11 and condenser 17 by-passes the radio frequency current around this battery.

The meter 15 is a good visual indicator at low sub-audible beat frequencies due to its pointer swinging back and forth in step with the plate current variations corresponding to the beat frequency. It is a definite means in addition to the lamp system for determining the in step or fixed phase relation of the two frequencies; for instance, if both frequencies are in step the meter shows the greatest deflection and this deflection decreases in value for conditions when the frequencies are out of step finally reaching a minimum when a 180 degree relationship is obtained.

The loud speaker 20 serves as an aural indicator of beat frequency. The required audio frequency voltage for operation of the loud speaker is obtained from the plate circuit through the condenser 19. It may be said in this instance, that the relay 13 with its small by-pass condenser 14 provides sufficient choking effect at audio frequencies to reject enough audio frequency voltage to operate the loud speaker. A plate current change of five milliamperes has been found sufficient to operate a loud speaker in this circuit and obtain a sound response which can be heard at a distance of approximately two hundred feet.

The system described may be used to advantage for accurate calibrations of two frequency standards and also as a means for denoting frequency changes which may be due to any cause. It can also be employed for monitoring radio and audio frequency generators of all types provided one frequency source is a piezo electric crystal oscillator or a similar constant frequency generator. There are numerous other uses to which this system can be applied because of the precision measurement which is possible by this method.

In Fig. 2 a grid leak and stopping condenser 23 are employed in place of the biasing battery 10 of Fig. 1. As previously stated, the reverse current or relay action is observed with this combination in circuit 21 and in view of this condition the lamps are reversed i. e., the green lamp is placed above the red lamp. The grid leak and condenser 23 causes an increase in negative potential on the grid or in effect a maximum decrease in plate current when the grid voltage excitation is greatest. This latter method with circuit shown in Fig. 2 will indicate very definitely when the two sources are 180 degrees out of phase, because of the maximum plate current in detector plate or relay circuit when the two excitation voltages cancel each other. This maximum current condition will throw the relay armature to the red lamp side if the relay is adjusted to operate at the maximum current condition. The true in phase condition cannot be indicated by this relay combination but can be noted by the minimum deflection on the meter 15.

This grid leak and condenser circuit 23 can be modified to indicate definitely the true in phase condition by resort to the modified relay circuit shown in Fig. 3. In this figure a battery 24 and a resistance 25 are shunted across the relay. The direction and magnitude of the current from the battery 24 are such as to reduce the current flow through the relay to zero. The adjustment for the zero current value is obtained by varying the resistance 25. The adjustment is made with no exciting voltage on the grid of the tube. It can be readily noted that as soon as the grid is excited that the plate current will be reduced and due to a change of equilibrium in the relay circuit, there will be an increase of current through the relay reaching a maximum value when the plate current is at a minimum. This current flow will be in the reverse direction but the polarized relay can be adjusted to operate under these conditions and also at any value of current which represents the condition equivalent to the in-phase relationship of the two frequency sources.

There are numerous uses for this indicator, but the principal application at present is for the absolute control of frequency. This may apply to a broadcasting station at radio frequencies or the control of frequency at a power house where 25 or 60 cycle current is required. It also can be used to assist in synchronizing two generators or it can be used to synchronize one generator at one station with that of another generator which is situated at another station. This latter condition is met with when a local power station requires extra power from a distant source to tide them over during the peak load periods.

To accomplish this synchronizing of low frequency generators additional apparatus is required in order to obtain as perfect a synchronization as is possible. It is an established fact that it is easier to determine or control a certain frequency if means are employed to multiply this frequency and then compare it with another frequency which is close or equal to a multiple of the original frequency. The accuracy of the determination in per cent of the frequency source is proportional to the multiple or harmonic of the frequency employed; for instance, if a 100 cycle is compared with another cycle source and the difference between the sources is one cycle then it may be said that there is a difference of one per cent. The two sources may be multiplied to frequencies which are 100 times the original frequencies and then the sources adjusted to be one cycle difference at the multiple frequency so that the difference is 1/100 of one per cent.

It is possible to adjust the relay of the beat frequency indicator to operate at the maximum current or the in-phase condition, but this condition with the low frequency, 25 or 60 cycle, may not be as accurate as may be required and to meet this requirement the multiple or harmonic frequencies should be compared. This latter comparison will indicate very definitely the true in-phase condition. If only one low frequency source is to be compared it is advisable to use a piezo electric crystal oscillator or any other source of constant frequency and compare said constant source against a harmonic of the low frequency source.

Fig. 4 shows a frequency multiplying system, wherein the low frequency source 50, say of 60 cycle frequency impressed on the grid of tube 27 causes the tube to deliver a distorted wave form. This distorted wave form is caused by the use of a high negative blocking voltage 26, which produces in the plate coil 28 a number of harmonics of appreciable strength. A resonant circuit 31 coupled to coil 28 picks out the desired harmonic and passes it on to the amplifier tube 33. The plate circuit 36 of this latter tube is tuned also to the required harmonic for purpose of filtering out undesired harmonic frequencies. Coupled to the plate resonant circuit 36 is a coil 37 which passes the required excitation voltage to the beat frequency indicator. The outputs of coupling coils 37 and 37' are respectively connected to the connections of frequency sources A and B of Fig. 1 and the difference in frequency is indicated in the manner described above for Fig. 1. The plate and filament batteries for the two tube circuits are shown at 29, 30, 34 and 35 respectively. The harmonic frequency as previously stated can be equal to any multiple, but for descriptive purposes I have indicated that the 100th harmonic or 6000 cycles is derived in the circuit of Fig. 4.

Band or high-pass filters can be employed to render the system more selective. Only one type of frequency multiplier is shown, but I desire that it be understood that any type of frequency multiplier may be employed.

The frequency multiplier shown in upper part of diagram is referred to as "A" frequency while the other frequency multiplier of identical characteristics shown in lower part of diagram is referred to as "B" frequency. I have represented parts of the "B" frequency circuit corresponding to the parts of the "A" frequency circuit by primed reference characters of similar numbers. Both of these frequency sources are connected to the input of the beat frequency indicator which functions in indicating the difference between the two frequencies. By adjusting the frequency of either source it is very easy to note by the lighting of the green light when perfect synchronism is obtained.

In the operation of the apparatus of my invention, the two branch circuits of the beat frequency indicator are independent, one circuit being set for the known or standard frequency, while the other circuit is substantially aperiodic over the required range for permitting a comparison of the unknown frequency with the known frequency. The relation between the known and unknown frequencies becomes apparent by the operation of the indicator lamps. When the unknown frequency is brought to a condition where it matches in value the standard frequency and is in phase with the standard frequency, the currents from both the standard frequency source and the unknown frequency source are integrated and operate the polarized relay system to shift the relay to that contact by which the green lamp is energized.

Where the unknown frequency differs from the known frequency and is out of phase with respect to the known frequency, the red lamp will be energized as there will be an interaction of the currents tending to cancel each other, resulting in lower effective plate current.

The apparatus of my invention has been found to be extremely practical in its operation, and while I have described particular embodiments of my invention, I desire that it be understood that modifications may be made by those skilled in the art. For example, the two radio frequency amplifiers may be dispensed with and the energy impressed directly upon the detector. The frequency multiplier circuits may or may not be used depending upon the accuracy or precision of readings required.

No limitations upon my invention are intended other than are imposed by the scope of the appended claims.

What I claim as new and desire to secure by Letters Patent of the United States is as follows:

1. In a precision system for indicating frequency differences, a source of known frequency, a source of unknown frequency, separate electron tube circuits connected to each of said sources for multiplying the frequency of each of said sources, an amplifier circuit individual to each of said electron tube circuits, tuning means connected with the input of each of said amplifier circuits for tuning said amplifier circuits to a selected harmonic of the multiplied frequency, tuning means in the output circuit of each of said amplifier circuits responsive to the selected harmonic frequency, a combining circuit connecting the outputs of said amplifier circuits, said tuning means in the output circuits of said amplifier circuits operating to regulate the energy transferred to said combining circuit, and means connected to said combining circuit for indicating the frequency of said unknown source.

2. In a precision system for indicating frequency differences, a source of known frequency, a source of unknown frequency, separate electron tube circuits connected to each of said sources for multiplying the frequency of each of said sources, an amplifier circuit individual to each of said electron tube circuits, tuning means connected with each of said amplifier circuits for tuning said amplifier circuits to a selected harmonic of the multiplied frequency, a combining circuit coupled with each of said amplifier circuits, and means connected with said combining circuit for indicating the frequency difference between said multiplied frequencies for determining the value of said source of unknown frequency.

ALFRED CROSSLEY.